(12) United States Patent
Richardson

(10) Patent No.: US 7,544,137 B2
(45) Date of Patent: Jun. 9, 2009

(54) SPORTS SIMULATION SYSTEM

(76) Inventor: Todd E. Richardson, RR1, Tottenham, Ontario (CA) L0G 1W0

( * ) Notice: Subject to any disclaimer, the term of this patent is extended or adjusted under 35 U.S.C. 154(b) by 556 days.

(21) Appl. No.: 10/629,945

(22) Filed: Jul. 30, 2003

(65) Prior Publication Data
US 2005/0023763 A1 Feb. 3, 2005

(51) Int. Cl.
*A63B 67/00* (2006.01)
(52) U.S. Cl. .................. 473/415; 273/317.2
(58) Field of Classification Search .......... 473/415, 473/131; 273/317.1, 317.2, 317.7, 317.8, 273/317.9, 329, 330; 463/1, 2, 4, 5
See application file for complete search history.

(56) References Cited

U.S. PATENT DOCUMENTS

| | | | |
|---|---|---|---|
| 3,729,315 A | 4/1973 | Conklin et al. | |
| 4,150,825 A * | 4/1979 | Wilson | 473/152 |
| 4,805,159 A * | 2/1989 | Negendank et al. | 367/127 |
| 4,858,922 A * | 8/1989 | Santavaci | 473/192 |
| 5,111,410 A * | 5/1992 | Nakayama et al. | 434/258 |
| 5,221,082 A | 6/1993 | Curchod | |
| 5,333,874 A | 8/1994 | Arnold et al. | |
| 5,443,260 A | 8/1995 | Stewart et al. | |
| 5,649,706 A | 7/1997 | Treat, Jr. et al. | |
| 5,768,151 A | 6/1998 | Lowy et al. | |
| 5,796,474 A * | 8/1998 | Squire et al. | 356/152.1 |
| 5,846,139 A | 12/1998 | Bair et al. | |
| 5,906,547 A | 5/1999 | Tynan | |
| 5,926,780 A | 7/1999 | Fox et al. | |
| 5,938,545 A * | 8/1999 | Cooper et al. | 473/407 |
| 5,984,794 A | 11/1999 | Miremadi | |
| 6,098,458 A * | 8/2000 | French et al. | 73/379.04 |
| 6,308,565 B1 * | 10/2001 | French et al. | 73/379.04 |
| 7,038,764 B2 * | 5/2006 | Lee | 356/28 |
| 7,335,116 B2 * | 2/2008 | Petrov | 473/407 |
| 2002/0036617 A1 | 3/2002 | Pryor | |
| 2006/0063574 A1 | 3/2006 | Richardson et al. | |
| 2007/0293331 A1 * | 12/2007 | Tuxen | 473/199 |

* cited by examiner

*Primary Examiner*—Ronald Laneau
(74) *Attorney, Agent, or Firm*—Merchant & Gould P.C.

(57) ABSTRACT

A sports simulation system includes a projectile tracking apparatus having a display surface on which a visually apparent three-dimensional sports scene is presented. The projectile tracking apparatus captures images of a projectile tracking region disposed in front of the display surface to detect a launched projectile traveling through the projectile tracking region towards the display surface. At least one processing stage communicates with the projectile tracking apparatus and is responsive to the image data to determine the three-dimensional positions, velocity and deceleration/acceleration of a detected projectile traveling through the projectile tracking region. The determined three-dimensional positions, velocity and deceleration/acceleration are used by the at least one processing stage to calculate a trajectory of the launched projectile into the visually apparent three-dimensional sports scene. Updated image data is generated by the at least one processing stage that includes a simulation of the launched projectile into the visually apparent three-dimensional sports scene following the calculated trajectory. A display device coupled to the at least one processing stage receives the image data from the at least one processing stage and presents the visually apparent three-dimensional sports scene, including the simulation, on the display surface.

49 Claims, 13 Drawing Sheets

SPORTS SIMULATION SYSTEM

FIELD OF THE INVENTION

The present invention relates generally to entertainment systems and in particular to a sports simulation system. The present invention also relates to a projectile tracking apparatus for use in a sports simulation system to track accurately the path of a launched projectile.

BACKGROUND OF THE INVENTION

Sports simulation systems designed to simulate sports experiences are well known in the art. In many conventional sports simulation systems, a player propels a sports projectile such as a ball, puck, arrow, dart, etc. at a target image presented on a display screen. The motion of the sports projectile is detected and imaged and an extrapolation of the trajectory of the sports projectile is made. The extrapolated trajectory is then used to determine a sports result. The displayed image is in turn updated to reflect the sports result thereby to provide the player with visual feedback and simulate a sports experience.

The goal of all sports simulation systems is to provide the player with a realistic sports experience. As a result, many variations of sports simulation systems have been considered in attempts to simulate accurately "real-life" sports experiences. For example, U.S. Pat. No. 5,443,260 to Stewart et al. discloses a baseball training and amusement apparatus that detects the speed and projected flight of a batted baseball. The apparatus includes a ball delivery device, a pair of detection planes, a computer and a video and simulation monitor. The detection planes are parallel to one another and are spaced apart by a distance such that a batted ball passing through the detection planes would be a fair ball in a real baseball game. Each detection plane includes a rigid frame that supports a pair of optical scanners and a pair of light sources. The optical scanners and light sources are positioned at opposite top corners of the rigid frame and are aimed downwardly into the region encompassed by the frame.

During use, the ball delivery apparatus delivers a baseball towards a player positioned in front of the detection planes. When the player strikes the baseball with a bat and the baseball travels through the detection planes, the optical scanners capture images of the baseball. The images are processed to determine the coordinates of the baseball as it passes through each of the detection planes as well as the velocity of the baseball. A simulated trajectory of the baseball is then calculated using the determined coordinate and velocity information. The simulated trajectory information is used to update the graphical images presented on the monitor so that the simulated flight of the batted baseball is displayed to the player thereby to simulate a batting experience.

U.S. Pat. No. 5,649,706 to Treat, Jr. et al. discloses a hunting simulator for in-flight detection of a launched missile such as an arrow. The hunting simulator includes a screen and a projector for projecting a moving target on the screen. Electromagnetic radiation emitters are positioned in front of the screen adjacent its opposite top corners and illuminate a plane in front of the screen. Sensors are also positioned adjacent the opposite top corners of the screen and are responsive to the electromagnetic radiation emitters. Retroreflective tape extends along opposite sides of the plane.

During use, when an arrow is launched at the screen and passes through the plane, the sensors detect the presence of the arrow and generate output. The output of the sensors is used to determine the coordinates of the arrow as well as the velocity of the arrow. A simulated trajectory of the arrow is then calculated and the graphical images presented on the screen are updated accordingly to reflect the flight of the launched arrow. In this manner, a hunting experience is simulated.

U.S. Pat. No. 5,768,151 to Lowy et al. discloses a system for determining the trajectory of an object in a sports simulator. The system includes a baseball throwing device to deliver a baseball towards a player area. A projector adjacent the player area presents images on a display screen that is positioned near the ball throwing device and in front of a batter. Video cameras are positioned in front of and on opposite sides of the anticipated trajectory of a hit baseball.

During use when a baseball delivered by the ball throwing device is hit by the batter and passes through the fields of the view of the video cameras, images of the baseball are captured and a streak showing the path of the baseball through the fields of view is determined. The streak is used to simulate the flight of the baseball and to update the image presented on the display screen thereby to simulate a batting experience.

Although the above references show sports simulation systems that capture images of launched projectiles and use the image data to simulate the flights of the launched projectiles, these sports simulation systems fail to provide "true to life" sports experiences as a result of the mechanisms used to track the path of the launched projectiles. As will be appreciated, improved sports simulation systems that provide better and more realistic sports experiences are desired.

It is therefore an object of the present invention to provide a novel sports simulation system and a novel projectile tracking apparatus.

SUMMARY OF THE INVENTION

Accordingly in one aspect of the present invention there is provided a sports simulation system comprising:

a projectile tracking apparatus including a display surface on which a visually apparent three-dimensional sports scene is presented, said projectile tracking apparatus capturing images of a projectile tracking region disposed in front of said display surface to detect a launched projectile traveling through said projectile tracking region towards said display surface; and at least one processing stage receiving the image data and determining the three-dimensional positions, velocity and deceleration/acceleration of a detected projectile traveling through said projectile tracking region, the three-dimensional positions, velocity and deceleration/acceleration being used by said at least one processing stage to calculate a trajectory of said launched projectile into said visually apparent three-dimensional sports scene.

Preferably, the at least one processing stage uses the calculated trajectory to generate updated image data including a simulation of the launched projectile into the visually apparent three-dimensional sports scene following the calculated trajectory. A display device coupled to the at least one processing stage receives the image data from the at least one processing stage and presents the visually apparent three-dimensional sports scene including the simulation on the display surface. It is also preferred that the visually apparent three-dimensional scene includes at least one foreground action element overlying and moveably over a background image. The at least one processing stage updates the image data so that the foreground action element responds to the simulation of the launched projectile. Preferably, the at least one foreground action element, background image and launched projectile simulation are treated as non-destructive overlay image planes that are combined seamlessly to complete the visually apparent three-dimensional sports scene.

In one embodiment, the projectile tracking apparatus includes a frame encompassing a rectangular region and at least one pair of imaging devices mounted on the frame. The imaging devices have overlapping fields of view looking across and in front of the display surface from opposite corners of the rectangular region and capture images of the projectile tracking region. Preferably, each of the imaging devices includes a first processor generating two-dimensional projectile position data as the projectile travels through the projectile tracking region. The two-dimensional projectile position data generated by each first processor is conveyed to a host processor and used by the host processor to generate three-dimensional position data and to calculate the velocity and deceleration/acceleration of the projectile.

In a preferred embodiment, the host processor executes sports simulation software including at least two of a training mode, a practice mode and a game play mode. The visually apparent three-dimensional sports scene is consistent with the selected mode. It is also preferred that the sports simulation software includes a plurality of selectable sports modules, each relating to a different sport that can be simulated. Each sport module includes at least two of the training, practice and game play modes.

In another aspect of the present invention there is provided a sports simulation system comprising:

a projectile tracking apparatus including a frame encompassing a display surface on which a video sequence portraying a visually apparent three-dimensional sports scene is presented; at least one pair of digital cameras mounted on said frame and having fields of view looking across and in front of said display surface that overlap in a generally perpendicular fashion and encompassing a projectile tracking region, each of said digital cameras including a first processor for processing image data and generating two-dimensional projectile coordinates when a projectile travels through said projectile tracking region and is captured in images acquired by said digital cameras; and an audio system to broadcast audio accompanying said video sequence;

a host processor communicating with said digital cameras and said audio system, said host processor calculating a three-dimensional trajectory of said projectile using the two-dimensional projectile coordinates received from each first processor and outputting image data including said calculated three-dimensional trajectory; and a display unit receiving said image data and presenting said video sequence including a simulation of said calculated trajectory on said display surface.

In yet another aspect of the present invention there is provided a projectile tracking apparatus for a sports simulation system comprising:

a frame encompassing a display surface on which a video sequence portraying a visually apparent three-dimensional sports scene is presented;

at least one pair of digital cameras mounted on said frame and having fields of view looking across and in front of said display surface that overlap in a generally perpendicular fashion and encompassing a projectile tracking region, each of said digital cameras including a processor for processing image data and generating two-dimensional projectile coordinates when a projectile travels through said projectile tracking region and is captured in images acquired by said digital cameras; and an audio system to broadcast audio accompanying said video sequence.

The present invention provides advantages in that since the positions, velocity and acceleration of the launched projectile are determined generally continuously as the launched projectile moves through the fields of view of the imaging devices, the flight of the launched projectile can be simulated more accurately. This of course results in a more realistic sports experience. The present invention also provides advantages in that virtually any type of projectile may be tracked avoiding the need for a specialized projectile. In addition, the projectile may be launched at the projectile tracking apparatus from a variety of positions providing greater flexibility and enhancing the sports experience.

BRIEF DESCRIPTION OF THE DRAWINGS

Embodiments of the present invention will now be described more fully with reference to the accompanying drawings in which.

DETAILED DESCRIPTION OF THE PREFERRED EMBODIMENT

The present invention relates generally to a sports simulation system including a projectile tracking apparatus having a display surface on which a visually apparent three-dimensional sports scene is presented. The projectile tracking apparatus captures images of a projectile tracking region disposed in front of the display surface to detect a launched projectile traveling through the projectile tracking region towards the display surface. At least one processing stage communicates with the projectile tracking apparatus and is responsive to the image data to determine the three-dimensional positions, velocity and deceleration/acceleration of a detected projectile traveling through the projectile tracking region. The determined three-dimensional positions, velocity and deceleration/acceleration are used by the at least one processing stage to calculate a trajectory of the launched projectile into the visually apparent three-dimensional sports scene. Updated image data is generated by the at least one processing stage that includes a simulation of the launched projectile into the visually apparent three-dimensional sports scene following the calculated trajectory. A display device coupled to the at least one processing stage receives the image data from the at least one processing stage and presents the visually apparent three-dimensional sports scene, including the simulation, on the display surface. Preferred embodiments of the present invention will now be described with reference to FIGS. 1 to 11.

Figure 1:
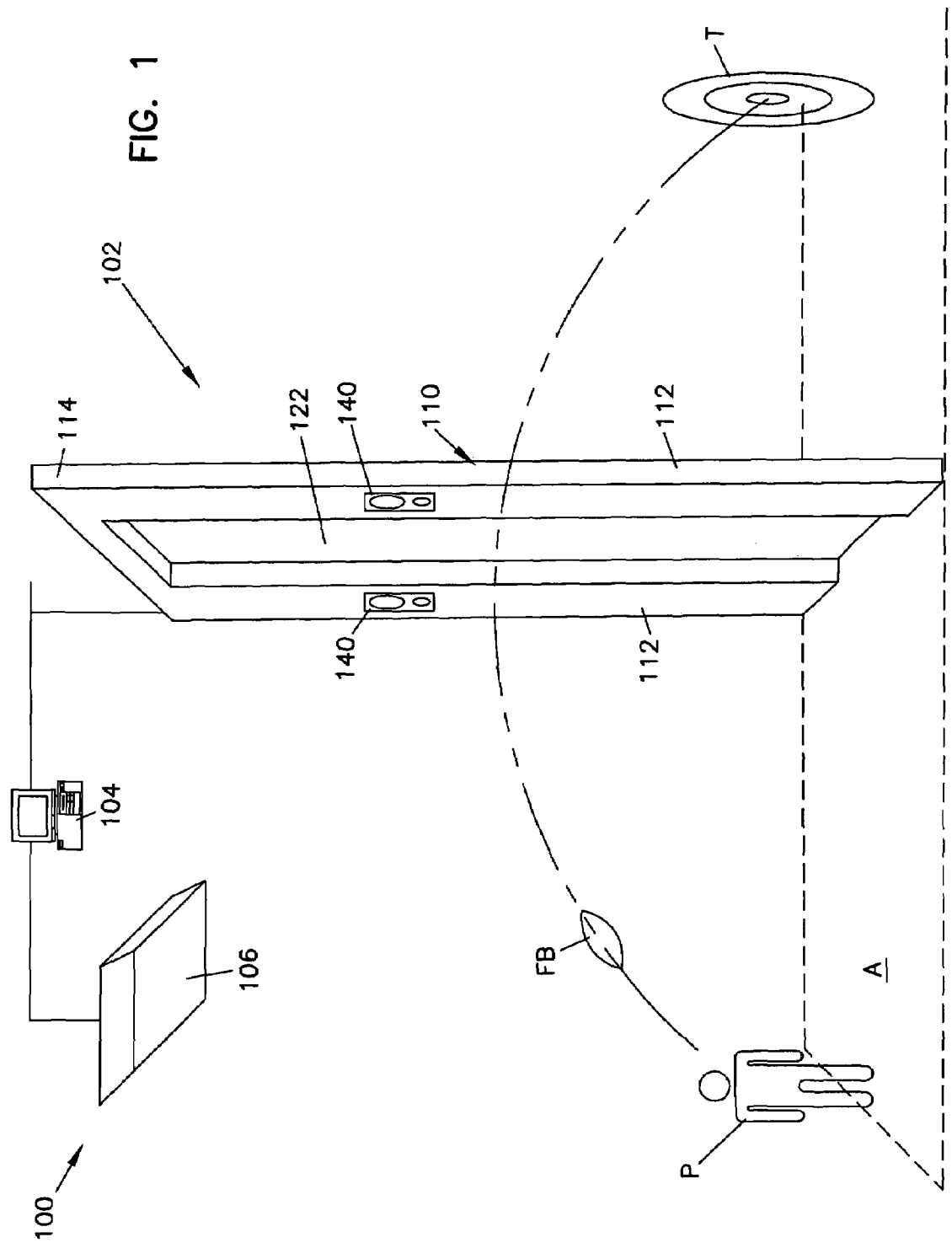
FIG. 1 is a perspective of a sports simulation system in accordance with the present invention.
Figure 2:
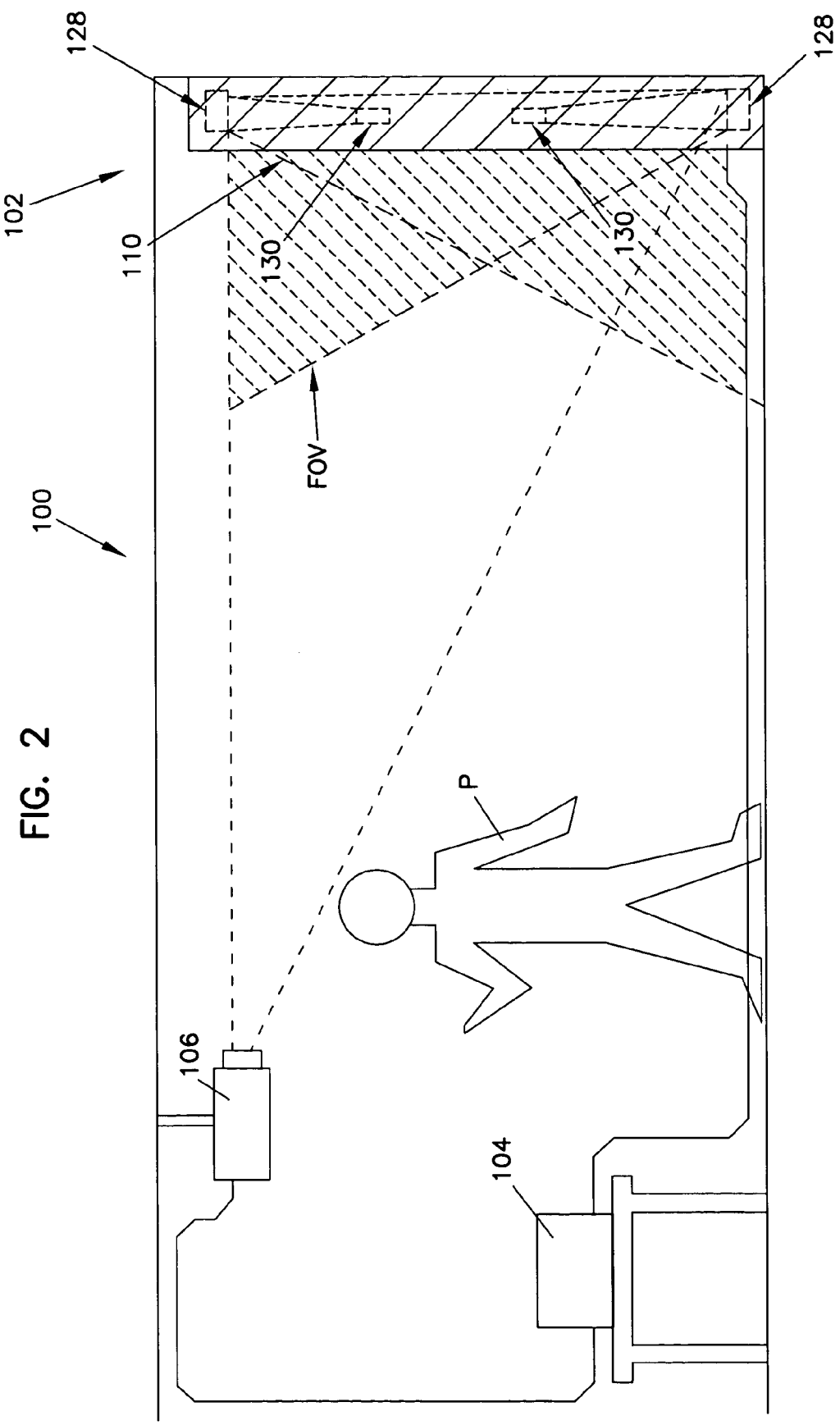
FIG. 2 is a side elevation view of the sports simulation system of FIG. 1.
Figure 3:
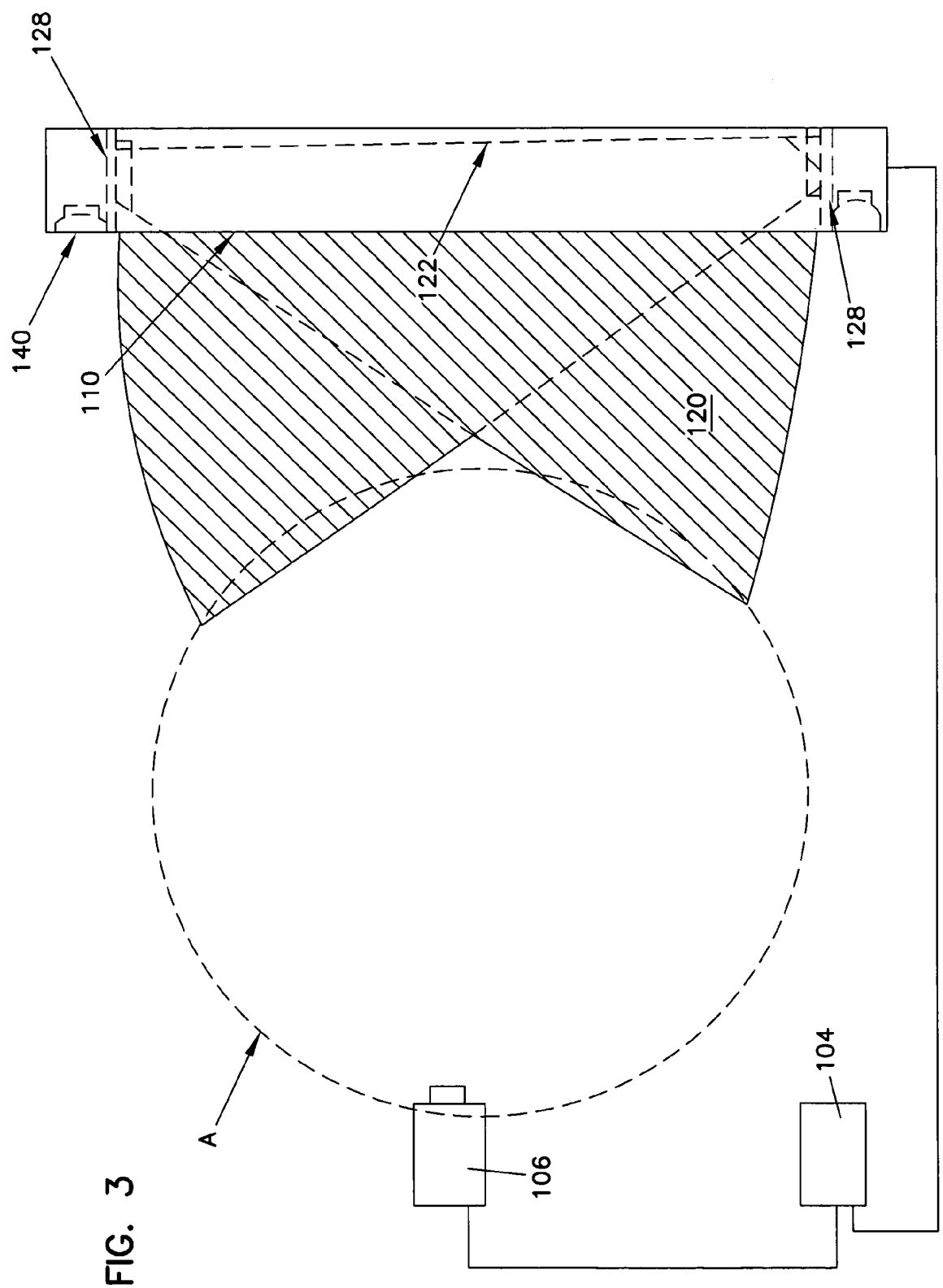
FIG. 3 is a top plan view of the sports simulation system of FIG. 1.
Figure 4:
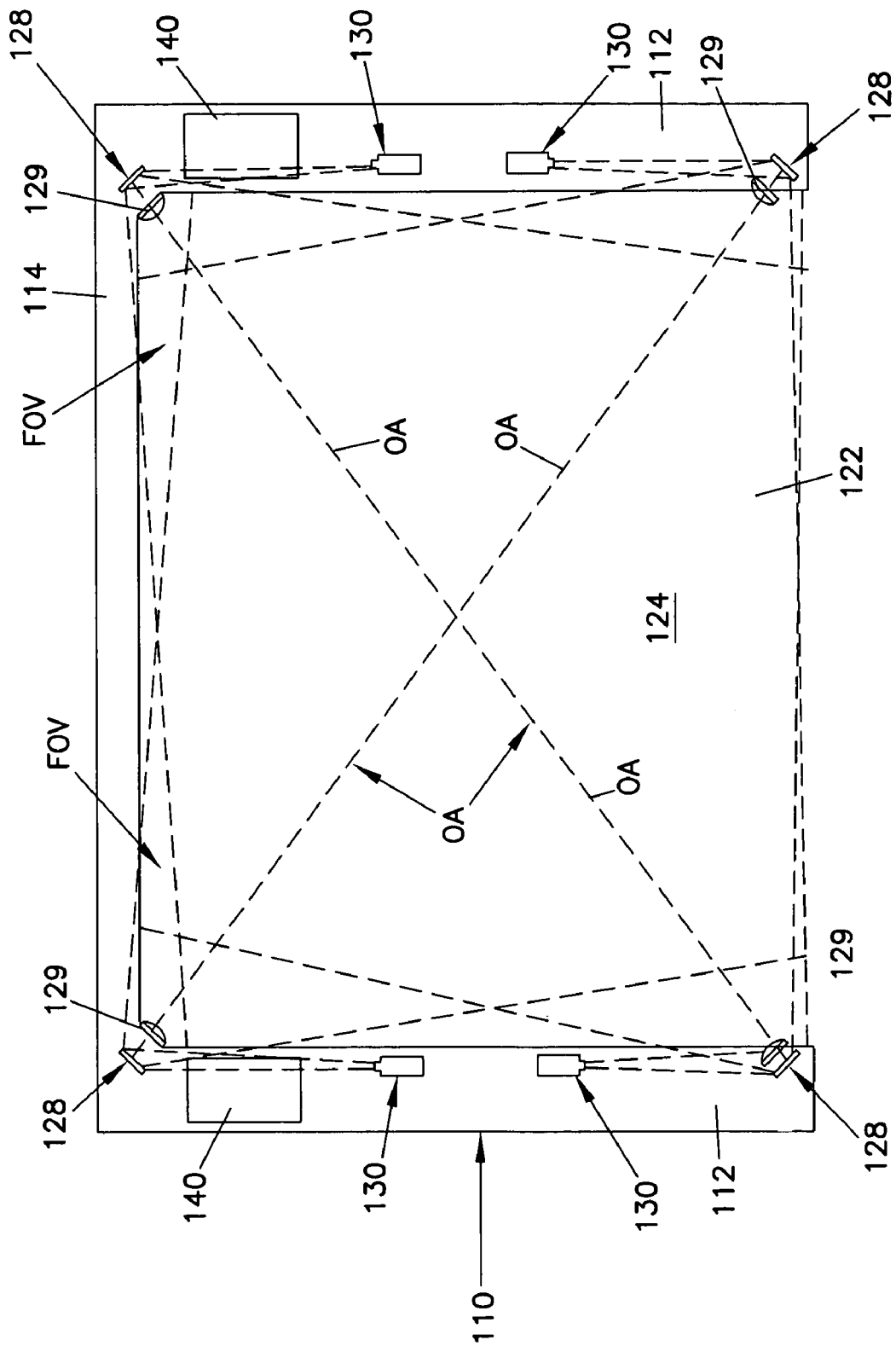
FIG. 4 is a front elevation view of a projectile tracking apparatus forming part of the sports simulation system of FIG. 1.

Turning now to FIG. 1, a sports simulation system in accordance with the present invention is shown and is generally identified by reference numeral 100. As can be seen, sports simulation system 100 includes a projectile tracking apparatus 102 disposed in front of a player area A in which a player P stands. A host computer 104 is coupled to the projectile tracking apparatus 102 via a high-speed serial data link and to a ceiling mounted front video projector 106 that is aimed at the projectile tracking apparatus 102. The computer 104 outputs video image data to the projector 106, which in turn projects a video sequence on the projectile tracking apparatus 102. The video sequence portrays a visually apparent three-dimensional sports scene including a target T at which a projectile is to be launched.

The projectile tracking apparatus 102 outputs two-dimensional projectile position data to the computer 104 when a projectile FB travels through a projectile tracking region monitored by the projectile tracking apparatus. The computer 104 in turn processes the two-dimensional projectile position data to determine the three-dimensional positions, velocity and acceleration of the projectile so that the trajectory of the projectile can be calculated. The calculated trajectory is then used to determine a sports result and to update the image data conveyed to the projector 106 so that the video sequence presented on the projectile tracking apparatus 102 shows a simulation of the projectile travel into the visually apparent three-dimensional scene as well as the determined sports result. As a result, the projectile tracking apparatus 102, the computer 104 and the projector 106 form a closed loop in response to a launched projectile. Further specifics of the sports simulation system 100 will now be described with reference to FIGS. 1 to 10.

FIGS. 2 to 6 further illustrate the projectile tracking apparatus 102. As can be seen, the projectile tracking apparatus 102 includes an upright, inverted U-shaped frame 110 having a pair of side posts 112 and a crossbar 114 extending between the upper ends of the posts 112. A screen 122 is supported by the frame 110. Screen 122 includes a display surface 124 on which images projected by the projector 106 are presented. In this embodiment, the screen 122 has a 4:3 aspect ratio making it particularly suited for displaying conventional television images. Those of skill in the art will however, appreciate that other image formats can be used. The screen 122 is preferably made of high strength, high durability nylon type material such as that manufactured by Dupont under the name Cordura®. The screen 122 is loosely fastened to the back of the frame 110 at spaced locations. The bottom of the screen 122 is free and is weighted. In this manner, the screen 122 absorbs impacts from launched projectiles thereby to reduce rebound potential. Preferably the frame 110 can be easily disassembled and reassembled making the projectile tracking apparatus 102 readily portable.

Mirrors 128 and associated lenses 129 are positioned at each corner of the frame 110. Each mirror has a reflective surface that forms approximately a 22.5° angle with respect to the horizontal. The lenses 129 are formed of durable plastic/acrylic material such as for example Lexan®. An imaging device in the form of a two-dimensional monochrome CCD digital video camera 130 is associated with each mirror 128 and lens 129 arrangement. The digital cameras 130 are mounted within the side posts 112. The optical axis OA of each digital camera 130 is aligned with the center of its associated mirror 128 so that the optical focal axes of the digital cameras 130 are reflected at approximately 45° angles towards the center of the display surface 124. The mirrors 128, which fold the optics, allow the digital cameras 130 to be positioned close to the projectile tracking region 120 while providing adequate focal distances to enable the digital cameras to capture focussed images.

Figure 5:
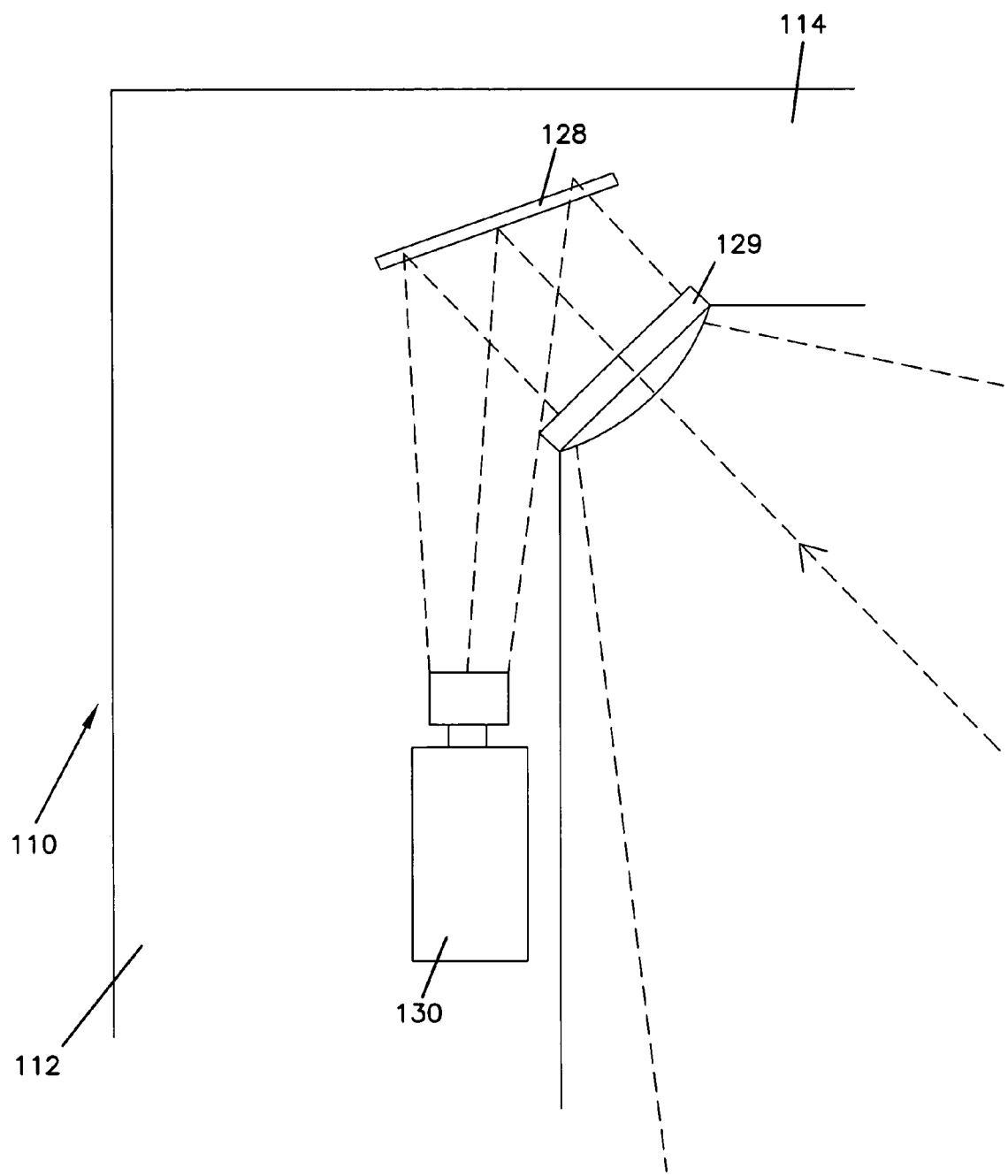
FIG. 5 is an enlarged front elevation view, partly in section, of a portion of the projectile tracking apparatus of FIG. 4 showing a digital camera and mirror and lens arrangement.
Figure 6:
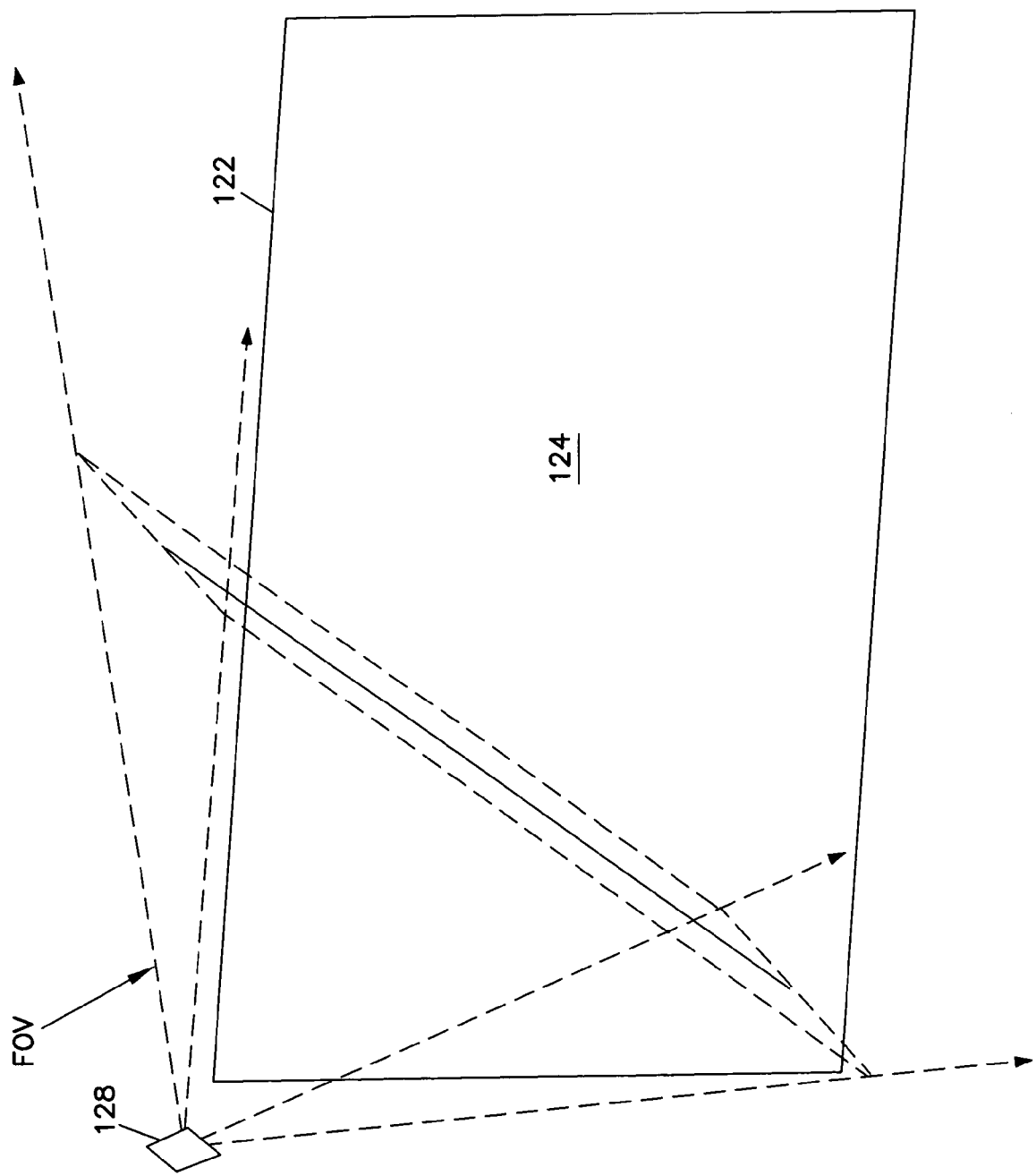
FIG. 6 is a perspective view showing the field of view of a digital camera relative to a screen that form part of the projectile tracking apparatus of FIG. 4.

The lens of each digital camera 130 in combination with the associated lens 129 provides each digital camera 130 with a viewing angle equal to at least 70 degrees and preferably between 75 to 85 degrees. The field of view FOV of each digital camera 130 as reflected by the associated mirror 128 looks across and in front of the display surface 124 of the screen 122 and is generally pyramidal in shape as shown in FIG. 5. The fields of view of the digital cameras 130 overlap in a generally perpendicular fashion to define a projectile tracking region or volume 120 shown by the hatched lines in FIGS. 2 and 3. The lenses 129 also serve as protective covers to protect the mirrors 128 and inhibit debris from entering into the frame 110. Each digital camera 130 includes an on-board processor (not shown) to perform image data preprocessing as well as an IR pass filter (not shown).

In this embodiment, each digital camera 130 has a 640 by 480 pixel array and can be operated at very high frame rates thereby allowing multiple images of a fast moving projectile to be captured as it travels through the projectile tracking region 120. For example, in the case of a projectile travelling through the projectile tracking region 120 at a speed of 200 miles per hour, the frame rates of the digital cameras 130 are selected such that at least four images of the projectile are captured by each digital camera 130. The viewing angles of the digital cameras 130 and the dimensions of the frame 110 are selected to provide the digital cameras 130 with a resolving accuracy of approximately 1 mm per pixel. As a result, a small projectile such as a golfball will activate approximately 12 pixels per image. This resolving accuracy enables even small, very fast moving launched projectiles to be readily determined in captured images and as a result, reduces false projectile detection.

Figure 7A:
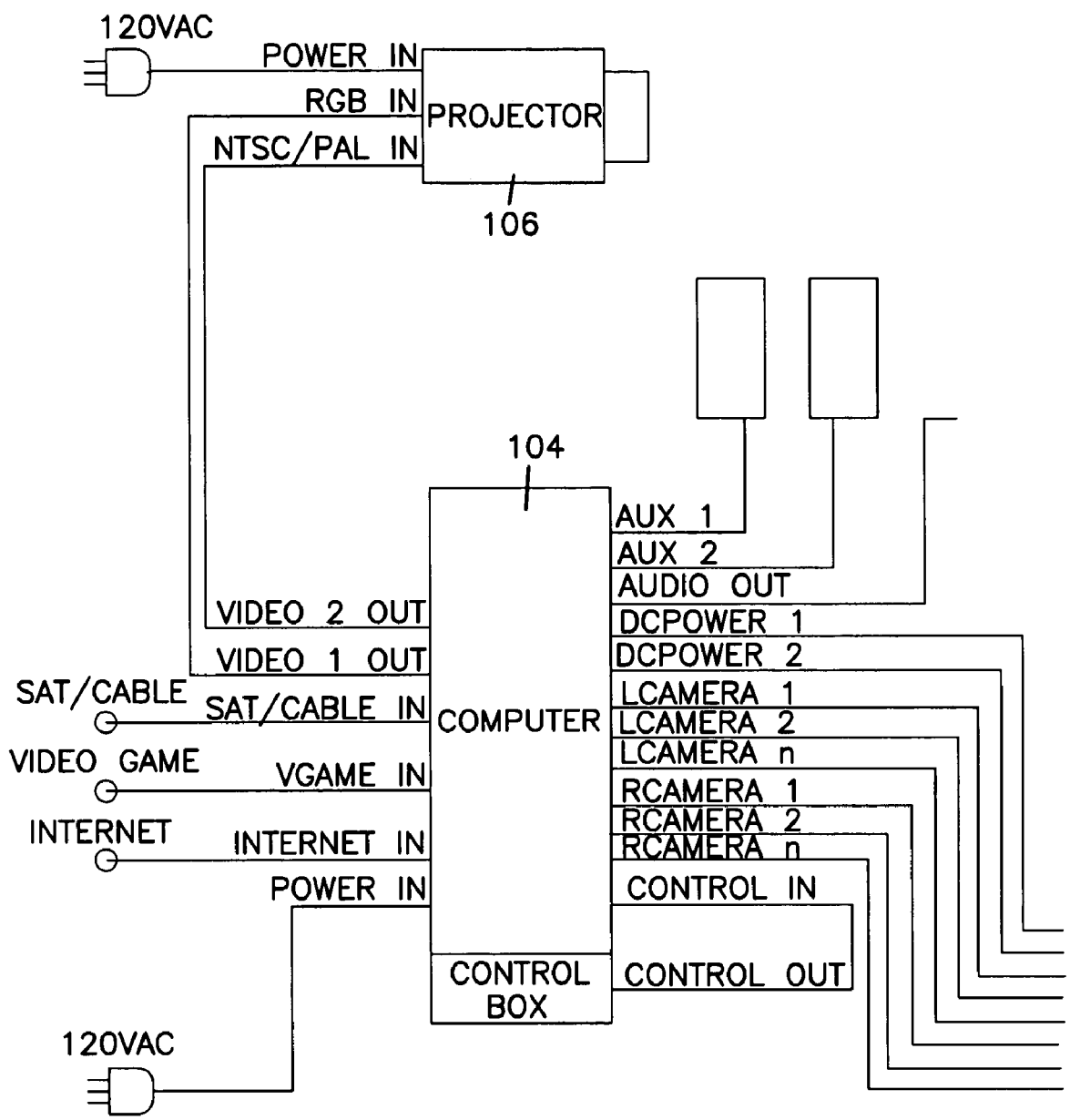
FIG. 7 is a schematic block diagram showing the electrical components of the sports simulation system of FIG. 1.
Figure 7B:
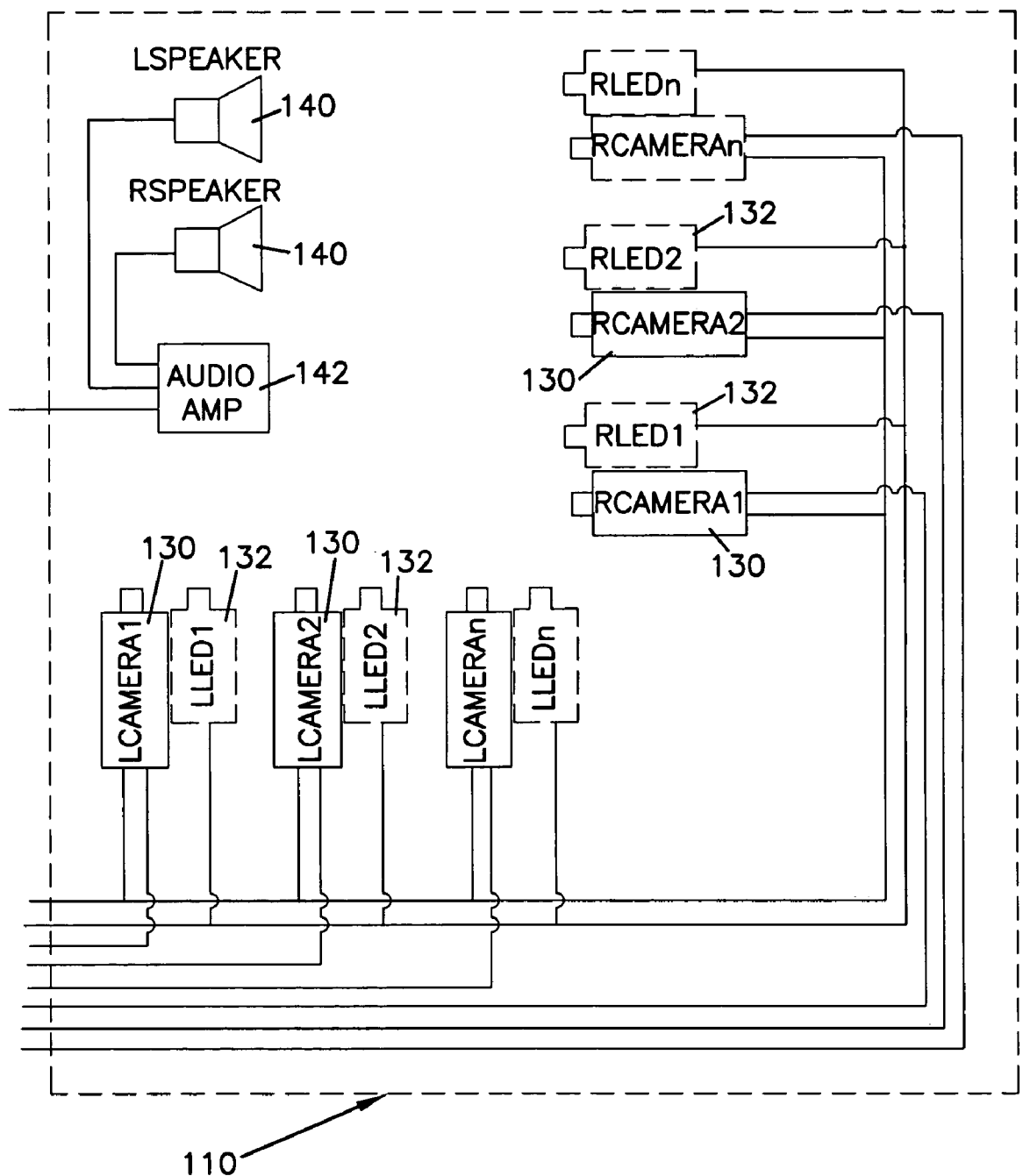

Infrared (IR) light emitting diode (LED) arrays 132 are also positioned within the posts 122 beside the digital cameras 130. Each IR LED array 132 is associated with a digital camera 130 and emits IR radiation that is reflected by the associated mirror 128 into the projectile tracking region 120. Audio speakers 140 are provided on the posts 112 and are aimed forwardly toward the player area A. The audio speakers 140 are driven by an audio amplifier 142 accommodated within the frame 110 as shown in FIG. 7. The audio amplifier 142 receives audio input from the computer 104 during play that is conveyed to the audio speakers 140 for broadcast thereby to enhance the sports experience.

The projector 106 preferably has a resolution of at least 800×600, at least 1200 ANSI Lumens brightness, a short throw lens, vertical 'keystone' correction, and the capacity to output digital RGB computer video signals, and NTSC/PAL baseband television video signals. Projectors having this set of features include the Epson Powerlite 820P, the Toshiba TDP-DI-US, the InFocus LP650 and the Sanyo XP30 for example.

The computer 104 is preferably an IBM compatible personal computer including an Intel Pentium® processor, at least 8 MB SDRAM, a high-speed hard drive, and a DVD player. The computer 104 also includes a display adapter assembly including a reconfigurable 32-bit video memory buffer partitioned into three separate buffers. One of the buffers is used to store primary foreground image data representing one or more independent foreground action elements. A second of the buffers is used to store background image data and the third buffer is used to store projectile trajectory image data. The display adapter assembly treats the foreground action, background and projectile trajectory image data as overlay image planes that are combined seamlessly to generate the video image data that is output to the projector 106. The overlay image planes are non-destructive so that when a foreground action element and/or projectile moves over an underlying image plane it is not necessary to redraw the underlying image plane. To reduce peak processing requirements, the computer 104 updates the background image data less frequently than the foreground image data. The computer 104 provides the output video image data to the projector 106 on a video output channel. The computer 104 receives external video feeds on a television/satellite/cable input channel, a video game input channel and an Internet input channel.

The computer 104 is mounted within a protective enclosure (not shown) having external connectors to enable the computer to be coupled to the projector 106, the audio amplifier 142 and the digital cameras 130. The enclosure also includes external connectors to allow the computer 104 to receive the television/satellite/cable, external video game and Internet feeds. Input controls are also provided on the enclosure to allow a player to interact with the computer 104.

The computer 104 executes sports simulation software stored in the SDRAM. The sports simulation software includes a plurality of sports simulation modules relating to sports that require a player to launch a projectile at the projectile tracking apparatus 102 in response to the video sequence displayed on the screen 122. To reduce memory requirements, the video image data associated with each video sequence is stored in compressed form in the SDRAM and is decompressed on the fly during display.

In this particular embodiment, the sports simulation modules include a baseball module, a football module, a soccer module, a golf module and a hockey module. Each sports module includes three routines, namely a play game routine, a practice routine and a training routine. Each sports module also includes a characteristic projectile signature representing the projectile associated with the particular sport. The characteristic projectile signature is used to facilitate projectile detection during play as will be described.

During execution of the play game routine, the associated sport is simulated providing the player with a realistic sports experience. Skill levels, player preferences and statistics to be monitored can be set by the player prior to game play. The player can select whether to play against the computer 104, against another player or against an on-line player over an Internet connection. During execution of the practice routine, practice exercises are simulated. Again, skill levels, player preferences and statistics to be monitored can be set by the player prior to game practice. During execution of the training routine, training sessions are simulated.

Figure 8A:
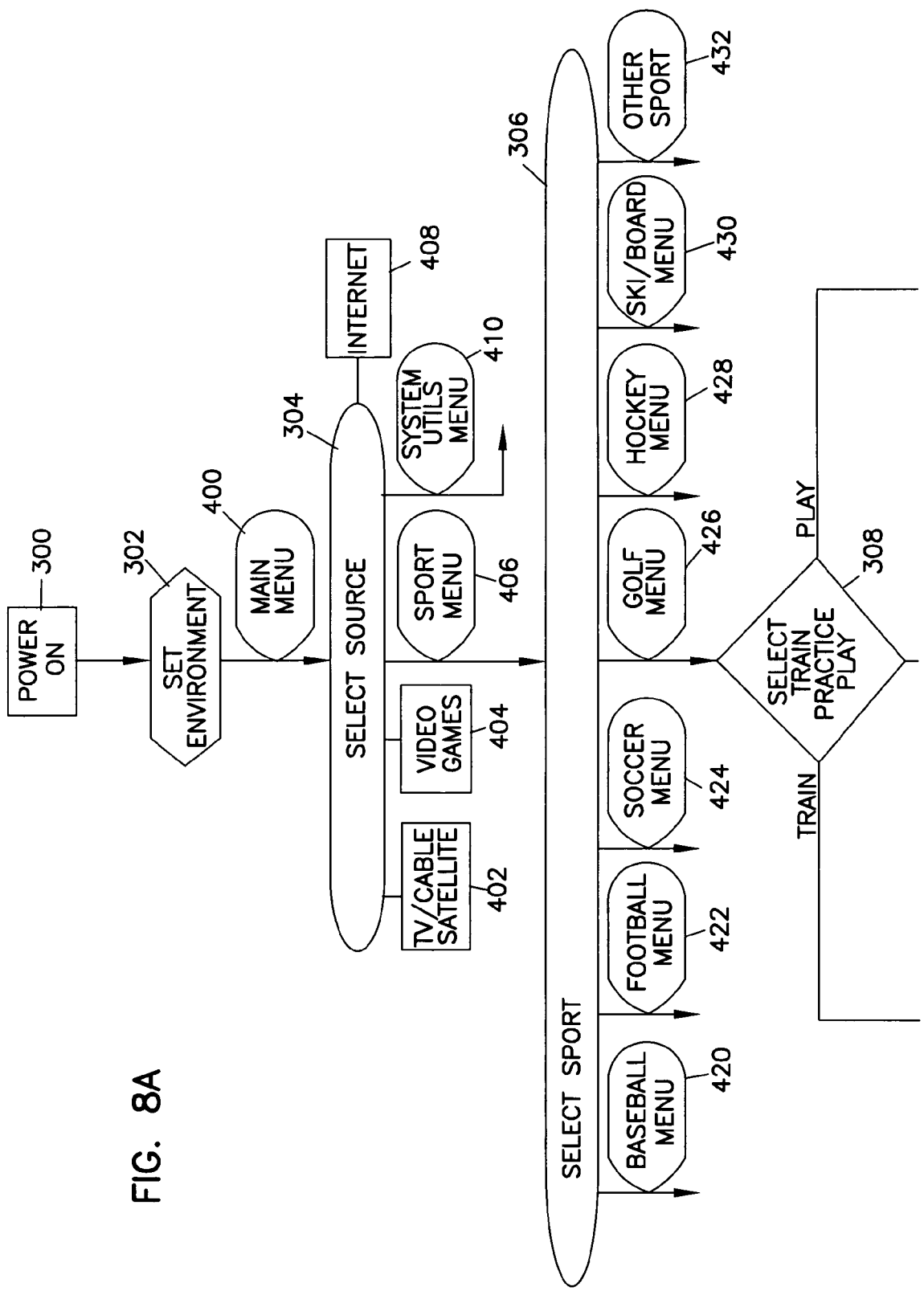
FIGS. 8 to 10 are flowcharts showing steps performed during player interaction with the sports simulation system of FIG. 1.
Figure 8B:
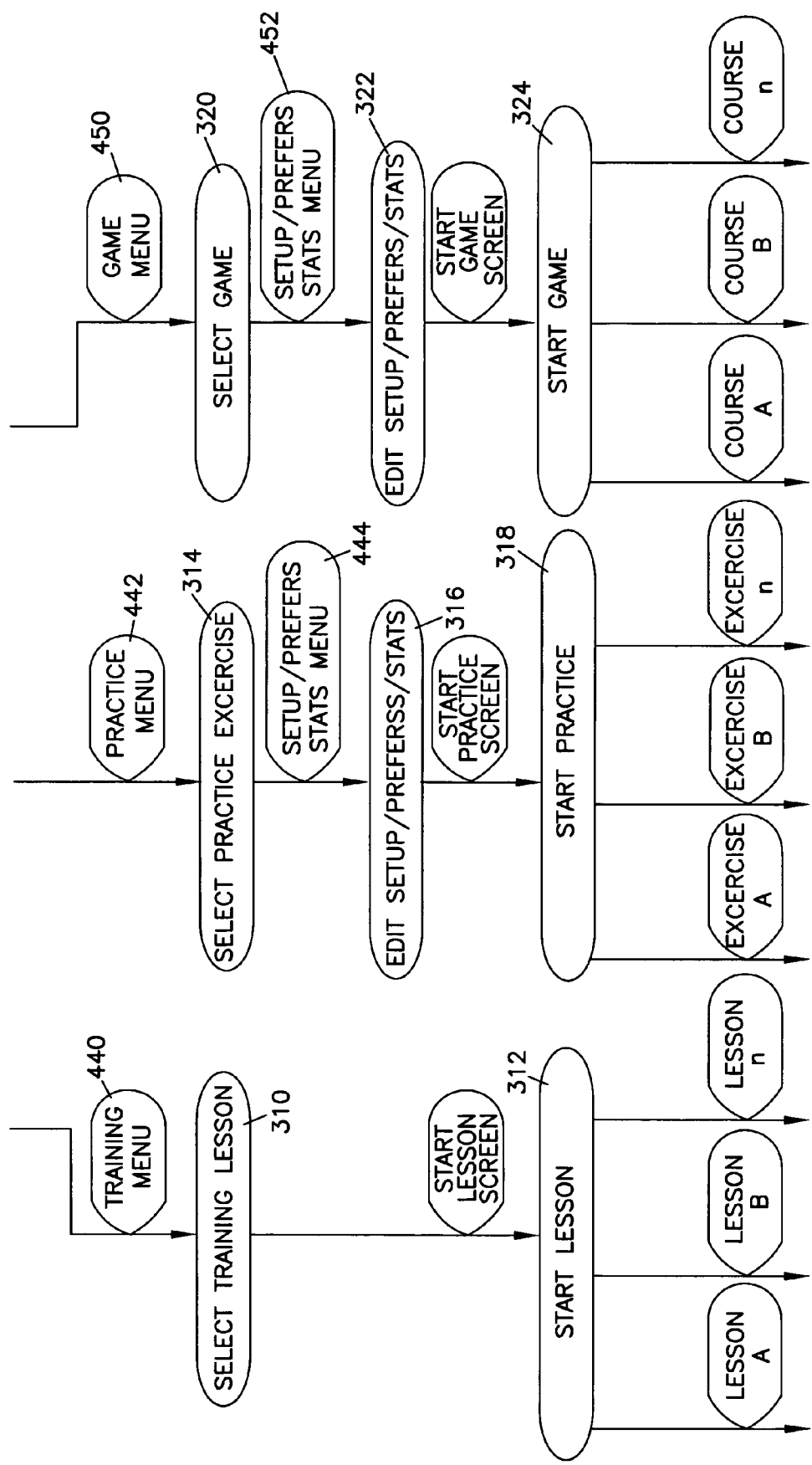
Figure 9:
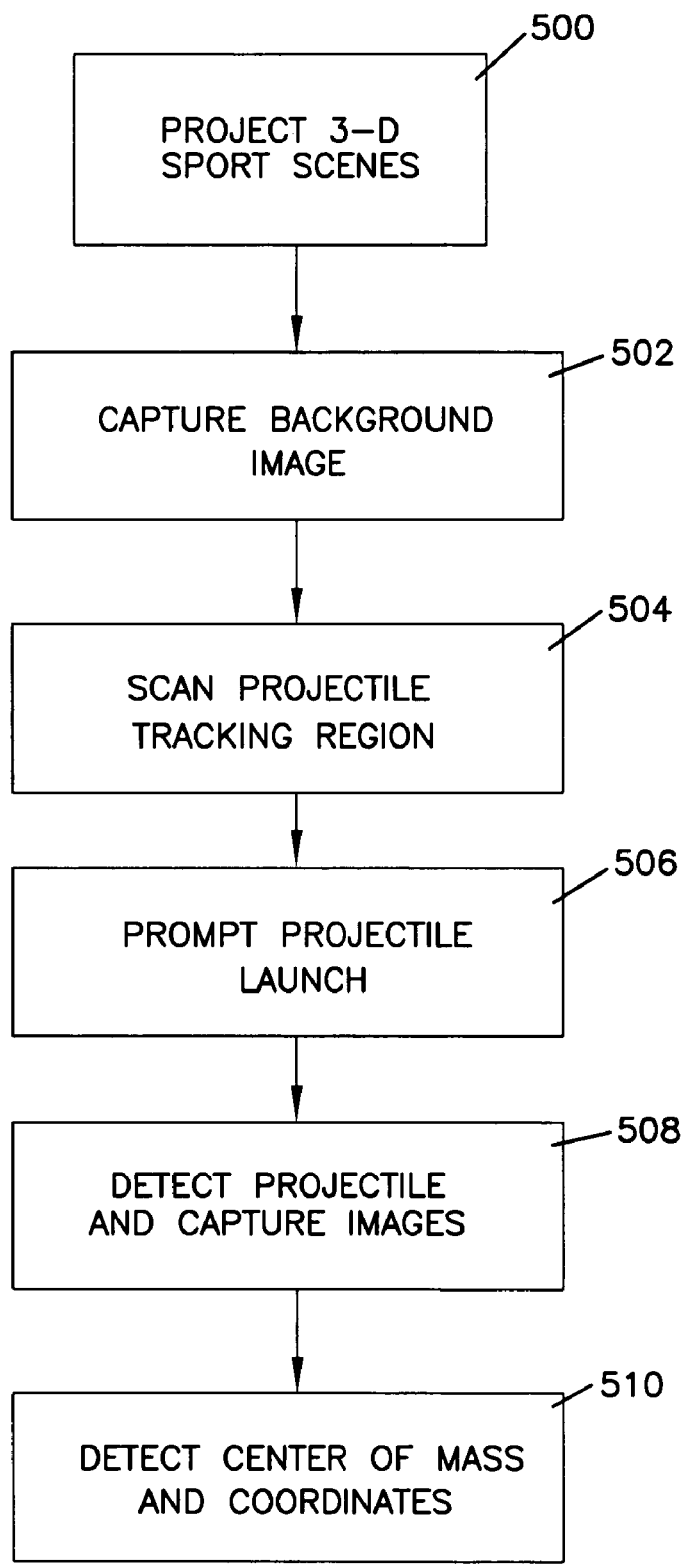
Figure 10:
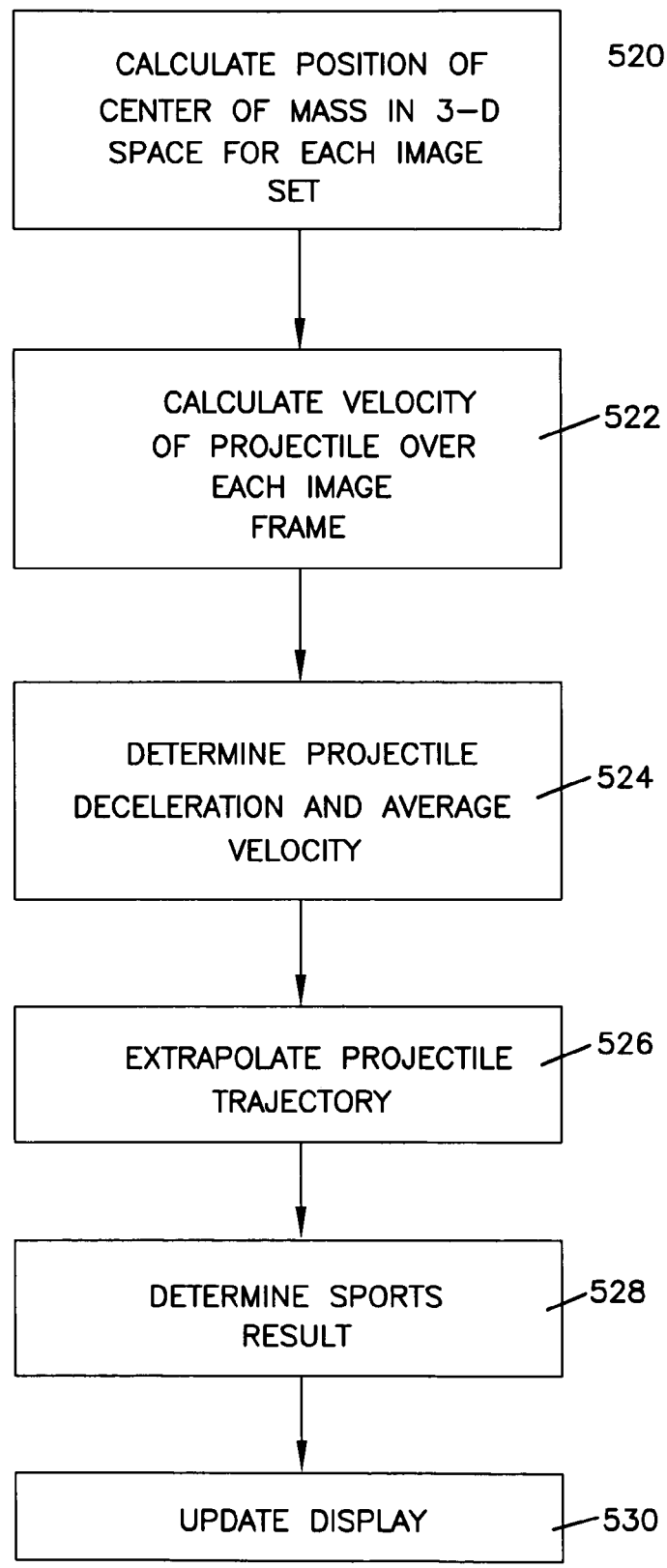

The initialization and operation of the sports simulation system 100 will now be described with particular reference to FIGS. 8 to 10. When the sports simulation system 100 is powered (step 300), the computer 104 performs a series of software diagnostics to set the environment and ensure that the projector 106, the digital cameras 130 and the audio amplifier 142 are functioning properly (step 302). A main menu 400 is then presented on the display of the computer 104 that allows the player to select an input video source (step 304). Specifically, the main menu includes a television/satellite/cable option 402, an external video game option 404, a sports simulation module option 406, an Internet option 408 and a system utilities option 410. When one of options 402, 404 and 408 is selected, the appropriate incoming video feed received by the computer 104 is used to generate the video image data that is output to the projector 106 for display on the screen 122.

When the sports simulation module option 406 is selected, the computer 104 presents a sports module menu listing available sports modules that can be selected (step 306). In this example, the sports module menu includes a baseball module 420, a football module 422, a soccer module 424, a golf module 426, a hockey module 428, a skiboard module 430 and an other sport option 432. When a sports module is selected, the computer 104 presents an operation mode menu and prompts the player to select a mode of operation (step 308). The available modes of operation include a training mode, a practice mode and a play game mode. The computer 104 also downloads the characteristic projectile signature associated with the selected sports module to the on-board processors of the digital cameras 130.

When the training mode is selected, the computer 104 executes the training routine associated with the selected sports module. During execution of the training routine, a training menu 440 is presented to the player allowing the player to select a training lesson (step 310). The training lessons cover various elements of the particular selected sport and include video clips that provide tips from professional athletes. Once the training lesson has been selected, the training lesson is commenced (step 312).

When the practice mode is selected, the computer 104 executes the practice routine associated with the selected sports module. During execution of the practice routine, a practice menu 442 is presented to the player allowing the player to select a practice session (step 314). The practice sessions include skills oriented practice exercises associated with the particular selected sport. Once the practice session is selected a setup menu 444 is presented to the player that provides the player with the ability to set the skill level, preferences and the statistics to be maintained during practice (step 316). Once the practice session setup has been completed, the selected practice session is commenced (step 318).

When the play game mode is selected, the computer 104 executes the play game routine associated with the selected sports module. During execution of the play game routine, a game menu 450 is presented to the player allowing the player to select a game session (step 320). For example, if the golf module 426 is selected at step 306, the game menu 450 presents a list of different golf courses that can be played. Once the game session is selected a setup menu 452 is presented to the player that provides the player with the ability to set the skill level, preferences and the statistics to be maintained during game play (step 322). Once the game session setup has been completed, the selected game is commenced (step 324).

During training, practice or game play, the computer 104 outputs video image data to the projector 106 causing the projector 106 to project a video sequence portraying a visually apparent three-dimensional sports scene on the display surface 124 that includes a target at which the projectile is to be launched (step 500). The computer 104 also conditions the digital cameras 130 to capture a background image of the projectile tracking region 120 devoid of a projectile (step 502) and then scan the projectile tracking region to look for the presence of a launched projectile at a very high frame rate in the order of 360 Hz (step 504). The player is then prompted to launch the projectile at the screen 122 (step 506).

When the player launches the projectile at the projectile tracking apparatus 102 and the projectile enters the projectile tracking region 120, the digital cameras 130 scanning the projectile tracking region 120 detect the presence of the projectile. In response, the digital cameras 130 synchronously capture a series of images of the projectile as it travels through the projectile tracking region at a decreased frame rate in the order of 120 Hz (step 508). As each image is captured, the on-board processor of the digital camera 130 segments and analyzes the image data to detect the center of mass of the projectile and determine the two-dimensional rectangular coordinates of the center of mass relative to the field of view FOV of the digital camera (step 510). The rectangular coordinates are then conveyed to the computer 104 via the high-speed serial data link. As a result, the computer 104 receives a series of two-dimensional rectangular coordinates from each digital camera 130 representing the two-dimensional positions of the projectile as it travels through the projectile tracking region 120 relative to that digital camera 130.

At step 502, each digital camera 130 captures a background image and generates a reference greyscale histogram. Since the projectile tracking region 120 is illuminated by IR radiation, when no projectile is in the projectile tracking region 120, the pixels of the digital cameras 130 are all illuminated. However, when a projectile enters the projectile tracking region 120, the projectile occludes IR illumination and appears as a cluster of activated (i.e. dark) pixels in the captured images. The digital cameras 130 are then conditioned to capture images at a first frame rate and generate corresponding histograms. The generated histograms are compared with the reference greyscale histogram to yield a difference histogram. Each difference histogram is examined to detect pixel clusters having a signature that corresponds to the stored characteristic projectile signature. If a pixel cluster in the difference histogram matches the characteristic projectile signature, the captured image is deemed to include an image of the projectile. The background image is updated before each projectile launch to take ambient lighting conditions into account and maintain accurate projectile detection Upon receipt of the two-dimensional rectangular coordinates from the digital cameras 130, the computer 104 in turn calculates the positions of the projectile's center of mass in three-dimensional space using triangulation throughout its travel through the projectile tracking region 120 (step 520). With the position of the projectile in three-dimensional space known during its travel through the projectile tracking region 120 and knowing the frame rates of the digital cameras 130, the computer 104 calculates the velocity of the projectile over each image frame (step 522). The computer 104 then compares each calculated velocity with the previously calculated velocity to determine the deceleration/acceleration of the projectile and calculates the average velocity of the projectile over the entire projectile tracking region 120 (step 524).

With the three-dimensional positions, average velocity and deceleration/acceleration of the projectile known over the projectile tracking region 120, the computer 104 extrapolates an accurate trajectory for the projectile allowing a realistic simulation of curved and/or arcing projectiles to be generated (step 526). The computed projectile trajectory is then used to determine a sports result by estimating the intersection of the calculated projectile trajectory with the displayed video target (step 528). With the projectile trajectory computed and the sports result determined, the computer 104 updates the image data that is conveyed to the projector 106 so that the video sequence displayed on the display surface 124 of the screen 122 shows the simulated flight of the projectile and the sports result (step 530).

During video sequence display, when a simulation of the projectile flight is shown a graphical duplicate of the projectile is projected onto the display surface 124 of the screen 122 that begins its flight from the impact point of the projectile with the screen 122. In this manner, the projectile appears to continue its trajectory into the video scene thereby to achieve a realistic video effect.

Depending on the selected sports module, the computer 104 will update the image data so that foreground action elements react to the launched projectile and portray an appropriate response. For example, if the hockey module is selected, the player is presented with a video scene showing a foreground action goaltender defending a background net. In this case, the display adapter assembly configures the buffers so that the background image data is stored in an 8-bit buffer, the puck projectile data is stored in an 8-bit buffer and foreground action goaltender data is stored in a 16-bit buffer. The computer 104 updates the video sequence in response to a launched puck travelling through the projectile tracking region 120 so that the goaltender moves in the appropriate direction to stop the launched puck. In this case, the set skill level and the trajectory and velocity of the launched puck determines whether the goaltender moves quickly enough to stop the launched puck. As will be appreciated, when other sports modules are selected, the display adapter assembly configures the buffers to best generate a realistic video sequence.

If desired, the sports simulation system 100 may include a projectile delivery device to deliver a projectile into the player area A for subsequent launching of the projectile by the player towards the projectile tracking apparatus 102. For example, in the case of baseball, the sports simulation system may include a pitching machine to pitch baseballs towards the player allowing the player to hit baseballs towards the projectile tracking apparatus 102. In the case of hockey, the sports simulation system 100 may including a puck passing device to pass pucks to the player allowing the player to shoot the passed pucks towards projectile tracking apparatus 102. Depending on the nature of the projectile, if desired, the sports simulation system may be surrounded by protective netting or enclosed within a theatre to inhibit errant projectiles from escaping.

Also, if desired, the computer 104 may store a sports rules reference library and/or a statistics library associated with each of the sports modules. In this case, the libraries are accessible during game play through pop-up menus presented on the display surface 124 to provide the player with relevant sports related data.

Figure 11:
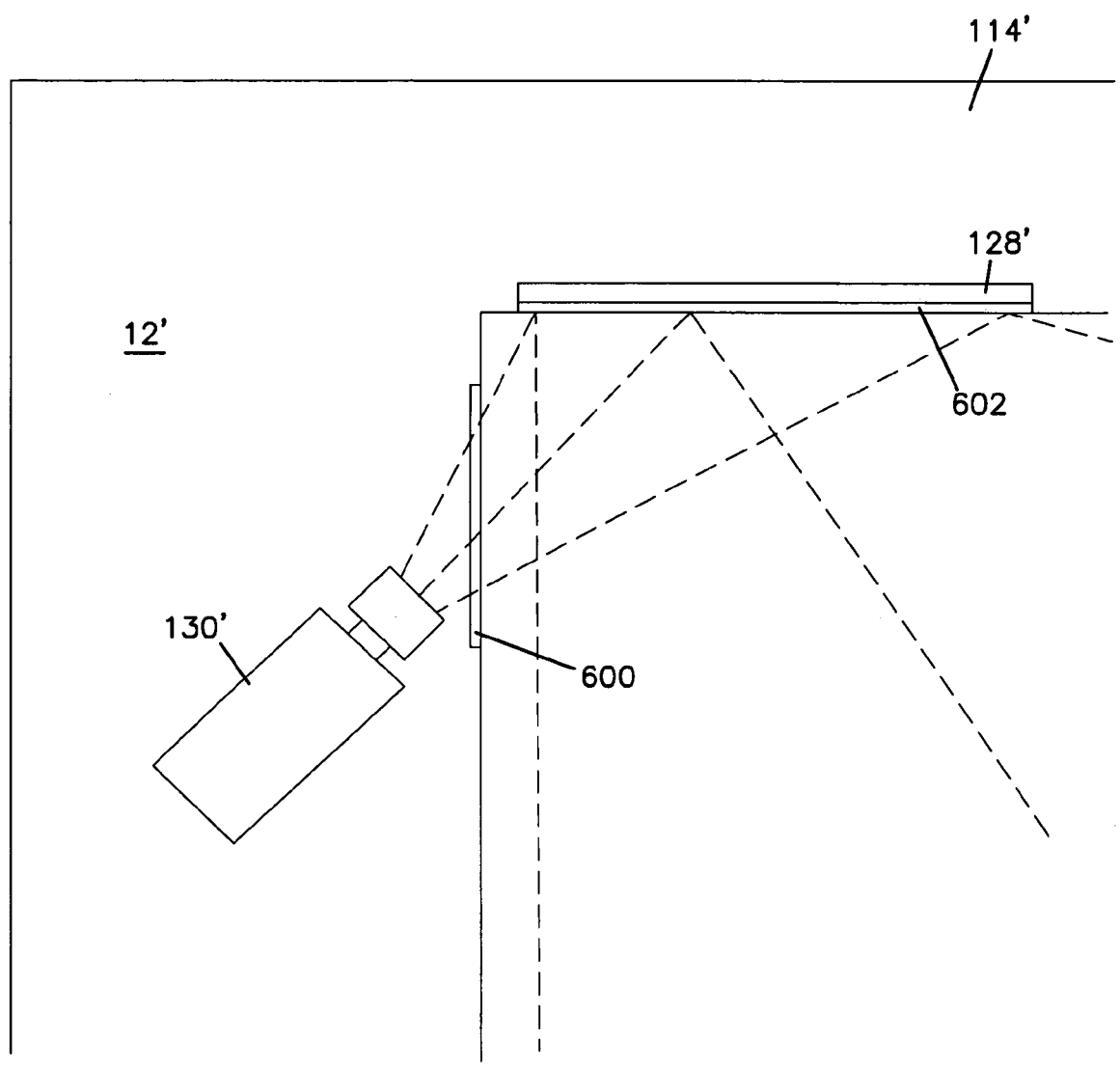
FIG. 11 is an enlarged front elevation view, partly in section, of an alternative digital camera and mirror arrangement for the projectile tracking apparatus of FIG. 4.

Turning now to FIG. 11, an alternative digital camera 130' and mirror 128' arrangement for the top corners of the projectile tracking apparatus is shown. As can be seen, in this arrangement, each digital camera 130' looks through a transparent plastic window 600 in the side post 112' and through a transparent plastic window 602 in the crossbar 114'. The mirror 128' overlies the window 602 to aim the optical focal axis of the digital camera 130' toward the center of the display surface.

The projectile tracking apparatus 102 has been described as including four digital cameras 130, each looking into the projectile tracking region 120 from a different corner of the frame 110. Those of skill in the art will appreciate that only one pair of digital cameras having overlapping fields of view is required to triangulate the position of the projectile as it travels through the projectile tracking region 120. Using only one pair of digital cameras is generally suitable in environments where the projectile is launched at slower speeds. When only one pair of digital cameras 130 is used, if the projectile typically enters the projectile tracking region 120 adjacent the lower portion of the frame 110, it is preferred that the fields of view of the digital cameras 130 look down into the projectile tracking region 120 from the top corners of the frame 110. If the projectile typically enters the projectile tracking region 120 adjacent the upper portion of the frame 110, it is preferred that the fields of view of the digital cameras 130 look up into the projectile tracking region 120 from the bottom corners of the frame 110. Depending on the sport being simulated and the speed of the projectile, the digital cameras 130 may be conditioned to capture multiple exposures during a single image frame in order to ensure sufficient light is gathered when the digital cameras are operated at very high frame rates In addition, the IR LED arrays may be strobed.

Although the sports simulation system 100 has been described as including a ceiling mounted front projector 106 in combination with a screen 122, those of skill in the art will appreciate that alternative projection devices may be used. For example, a rear video projector may be used to project images onto the rear surface of the display screen 122. The projector and display screen may alternatively be replaced with a display unit such as a cathode ray tube, a plasma display or a liquid crystal display, that receives video image output from the computer 104. In this case, the display unit is preferably disposed behind a transparent protective panel.

In the preferred embodiment, the projectile tracking apparatus has been described as determining the existence of the projectile in a captured image by detecting clusters of dark pixels. Those of skill in the art will appreciate however that the projectile may also be determined by detecting clusters of white pixels resulting from illumination reflecting off of the projectile. Those of skill in the art will also appreciate that the number of processing stages may be increased or decreased as desired to handle processing of the digital camera image data effectively in real-time and provide a realistic projectile simulation.

Although preferred embodiments of the present invention have been described, those of skill in the art will appreciate that variations and modifications may be made without departing from the spirit and scope thereof as defined by the appended claims.

What is claimed is:

1. A sports simulation system comprising:
a projectile tracking apparatus comprising a display surface on which a visually apparent three-dimensional sports scene is presented, said projectile tracking apparatus capturing and processing images of a projectile tracking region disposed in front of said display surface to detect a launched sports projectile generally continuously from its launch position, throughout its travel through said projectile tracking region and to its contact position with said display surface; and
at least one processing stage receiving image data from said projectile tracking apparatus and determining the three-dimensional positions, velocity and deceleration/acceleration of the detected launched sports projectile traveling through said projectile tracking region, the three-dimensional positions, velocity and deceleration/acceleration being used by said at least one processing stage to calculate a trajectory of said launched sports projectile into said visually apparent three-dimensional sports scene, wherein said at least one processing stage uses said calculated trajectory to generate updated image data representing a simulation of the flight path of said launched sports projectile beginning substantially at the display surface contact position and traveling into said visually apparent three-dimensional sports scene following said calculated trajectory so that said simulation represents a realistic continuance of the travel of said sports projectile beyond the display surface.

2. A sports simulation system according to claim 1 further comprising a display device coupled to said at least one processing stage, said display device receiving image data from said at least one processing stage and presenting said visually apparent three-dimensional sports scene including said simulation on said display surface.

3. A sports simulation system according to claim 2 wherein said visually apparent three-dimensional scene includes at least one foreground action element overlying and moveable over a background image, said at least one processing stage updating said image data so that said at least one foreground action element responds to the simulation of said launched projectile.

4. A sports simulation system according to claim 2 wherein said projectile tracking apparatus includes a frame and at least one pair of imaging devices mounted on said frame, said imaging devices having overlapping fields of view looking across and in front of said display surface and capturing images of said projectile tracking region.

5. A sports simulation system according to claim 4 wherein said imaging devices have generally perpendicular fields of view looking across and in front of said display surface from adjacent opposite corners of said frame.

6. A sports simulation system according to claim 5 wherein said frame encompasses a rectangular region and wherein said projectile tracking apparatus includes four imaging devices, each having a field of view looking across and in front of said display surface from a different corner of said rectangular region, said fields of view overlapping in a generally perpendicular manner.

7. A sports simulation system according to claim 6 wherein said visually apparent three-dimensional scene includes at least one foreground action element overlying and moveable over a background image, said at least one processing stage updating said image data so that said at least one foreground action element responds to the simulation of said launched projectile.

8. A sports simulation system according to claim 5 wherein each of said imaging devices includes a first processor constituting one processing stage, each said first processor generating two-dimensional projectile position data as said projectile travels through said projectile tracking region, said two-dimensional projectile position data being conveyed to a host processor constituting a second processing stage, said host processor using the two-dimensional projectile position data received from each first processor to generate three-dimensional projectile position data and to calculate the velocity and deceleration/acceleration of said projectile.

9. A sports simulation system according to claim 8 wherein each said first processor examines captured images to detect pixel clusters resembling a characteristic projectile signature thereby to detect said projectile in said captured images.

10. A sports simulation system according to claim 8 further including an audio system to broadcast audio accompanying said visually apparent three-dimensional sports scene and simulation.

11. A sports simulation system according to claim 2 wherein said at least one processing stage executes sports simulation software including at least two of a training mode, a practice mode and a game play mode, the visually apparent three-dimensional sports scene being consistent with the selected mode.

12. A sports simulation system according to claim 11 wherein said sports simulation software includes a plurality of selectable sports modules each relating to a different sport that can be simulated, each sports module including at least two of a training mode, a practice mode and a game play mode.

13. A sports simulation system according to claim 12 wherein said sports modules include a football module, a soccer module, a hockey module, a baseball module and a golf module.

14. A sports simulation system according to claim 9 wherein said host processor executes sports simulation software including at least two of a training mode, a practice mode and a game play mode, the visually apparent three-dimensional sports scene being consistent with the selected mode.

15. A sports simulation system according to claim 14 wherein said sports simulation software includes a plurality of selectable sports modules each relating to a different sport that can be simulated, each sports module including at least two of a training mode, a practice mode and a game play mode.

16. A sports simulation system according to claim 15 wherein said sports modules include a football module, a soccer module, a hockey module, a baseball module and a golf module.

17. A sports simulation system according to claim 16 further including an audio system to broadcast audio accompanying said visually apparent three-dimensional sports scene and simulation.

18. A sports simulation system according to claim 3 wherein said visually apparent three-dimensional sports scene includes a plurality of foreground action elements independently moveable over said background image.

19. A sports simulation system according to claim 3 wherein said at least one foreground action element, background image and launched projectile simulation are non-destructive overlay image planes that are combined seamlessly to complete said visually apparent three-dimensional sports scene.

20. A sports simulation system according to claim 18 wherein said foreground action elements, background image and launched projectile simulation are non-destructive overlay image planes that are combined seamlessly to complete said visually apparent three-dimensional sports scene.

21. A sports simulation system comprising:
a projectile tracking apparatus for tracking a launched sports projectile, said apparatus comprising: a frame encompassing a display surface on which a video sequence portraying a visually apparent three-dimensional sports scene is presented; at least one pair of digital cameras mounted on said frame and having fields of view looking across and in front of said display surface that overlap in a generally perpendicular fashion and encompassing a projectile tracking region extending generally between said display surface and a projectile launch area, each of said digital cameras including a first processor for processing image data and generating two-dimensional projectile coordinates generally continuously as the launched sports projectile travels generally from its launch point, through said projectile tracking region to its contact point with said display surface; and an audio system to broadcast audio accompanying said video sequence;
a host processor communicating with said digital cameras and said audio system, said host processor processing the two-dimensional projectile coordinates received from each first processor to determine the velocity and acceleration/deceleration of said projectile and using the determined projectile velocity and acceleration/deceleration to calculate a realistic three-dimensional trajectory of said sports projectile and outputting image data representing said calculated three-dimensional trajectory; and
a display unit receiving said image data and presenting said video sequence on said display surface, said video sequence representing a simulation of the flight path of said sports projectile following said calculated trajectory beginning from the contact point of said sports projectile with said display surface so that said simulation represents a realistic continuance of the travel of said sports projectile beyond the display surface.

22. A sports simulation system according to claim 21 wherein said visually apparent three-dimensional scene includes at least one foreground action element overlying and moveable over a background image, said host processor updating said image data so that said at least one foreground action element responds to the calculated trajectory of said projectile.

23. A sports simulation system according to claim 22 wherein said frame is readily assembled and disassembled 24. A sports simulation system according to claim 22 wherein said host processor executes sports simulation software including at least two of a training mode, a practice mode and a game play mode, the visually apparent three-dimensional sports scene being consistent with the selected mode.

25. A sports simulation system according to claim 24 wherein said sports simulation software includes a plurality of selectable sports modules each relating to a different sport that can be simulated, each sport module including at least two of a training mode, a practice mode and a game play mode.

26. A sports simulation system according to claim 25 wherein said sports modules include a football module, a soccer module, a hockey module, a baseball module and a golf module.

27. A sports simulation system according to claim 21 wherein each said first processor examines captured images to detect pixel clusters resembling a characteristic projectile signature thereby to detect said projectile in said captured images.

28. A sports simulation system according to claim 27 wherein said frame encompasses a rectangular region and wherein said projectile tracking apparatus includes four imaging devices, each having a field of view looking across and in front of said display surface from a different corner of said rectangular region, said fields of view overlapping in a generally perpendicular manner.

29. A sports simulation system according to claim 22 wherein said visually apparent three-dimensional sports scene includes a plurality of foreground action elements independently moveable over said background image.

30. A sports simulation system according to claim 22 wherein said at least one foreground action element, background image and launched projectile simulation are non-destructive overlay image planes that are combined seamlessly to complete said visually apparent three-dimensional sports scene.

31. A sports simulation system according to claim 29 wherein said foreground action elements, background image and launched projectile simulation are non-destructive overlay image planes that are combined seamlessly to complete said visually apparent three-dimensional sports scene.

32. A sports simulation system according to claim 22 wherein each said first processor examines captured images to detect pixel clusters resembling a characteristic projectile signature thereby to detect said projectile in said captured images.

33. A sports simulation system according to claim 32 wherein said visually apparent three-dimensional sports scene includes a plurality of foreground action elements independently moveable over said background image.

34. A sports simulation system according to claim 33 wherein said foreground action elements, background image and launched projectile simulation are non-destructive overlay image planes that are combined seamlessly to complete said visually apparent three-dimensional sports scene.

35. A projectile tracking apparatus for a sports simulation system comprising:
a frame encompassing a display surface on which a video sequence portraying a visually apparent three-dimensional sports scene is presented;
at least one pair of digital cameras mounted on said frame and having fields of view looking across and in front of said display surface that overlap in a generally perpendicular fashion and encompassing a projectile tracking region extending between said display surface and a projectile launch area, each of said digital cameras including a processor for processing image data and generating two-dimensional projectile coordinates generally continuously a at least when a sports projectile is launched from said launch area, travels through said projectile tracking region to its contact point with the display surface;
a host processor communicating with said digital cameras, said host processor processing the two-dimensional projectile coordinates received from the digital camera processors to determine the velocity and acceleration/deceleration of said sports projectile and using the determined projectile velocity and acceleration/deceleration to calculate a three-dimensional trajectory of said sports projectile and modifying the video sequence so that the video sequence shows the sports projectile traveling into the sports scene beginning from its contact point with the display surface following said calculated three-dimensional trajectory so that said video sequence represents a realistic continuance of the travel of said sports projectile beyond the display surface; and
an audio system to broadcast audio accompanying said video sequence.

36. A projectile tracking apparatus according to claim 35 wherein each said processor stores a projectile characteristic signature that is compared with captured images to detect the presence of a projectile therein.

37. A projectile tracking apparatus according to claim 36 wherein said frame encompasses a rectangular region and wherein said projectile tracking apparatus includes four imaging devices, each having a field of view looking across and in front of said display surface from a different corner of said rectangular region, said fields of view overlapping in a generally perpendicular manner.

38. A projectile tracking apparatus according to claim 37 further comprising a mirror associated with each digital camera to direct the field of view thereof across and in front of said display surface.

39. A golf simulator comprising:
a display surface on which a golf scene is presented;
imaging devices capturing images of a region in front of said display surface; and
processing structure receiving image data from said imaging devices and processing said image data to detect a launched golf ball generally continuously from its launch position, throughout its travel through said region and to its contact position with said display surface, said processing structure further processing said image data to determine the three-dimensional positions, velocity and deceleration/acceleration of the detected launched golf ball traveling through said region, the three-dimensional positions, velocity and deceleration/acceleration being used by said processing structure to calculate a trajectory of said launched golf ball into said golf scene, wherein said processing structure uses said calculated trajectory to generate updated image data representing a simulation of the flight path of said launched golf ball beginning substantially at the display surface contact position and traveling into said golf scene following said calculated trajectory so that said simulation represents a realistic continuance of the travel of said golf ball beyond the display surface.

40. A golf simulator according to claim 39 further comprising a display device coupled to said processing structure, said display device receiving image data from said processing structure and presenting said golf scene including said simulation on said display surface.

41. A golf simulator according to claim 40 wherein said golf scene includes at least one foreground action element overlying and moveable over a background image, said processing structure updating said image data so that said at least one foreground action element responds to the simulation of said launched golf ball.

42. A golf simulator according to claim 40 comprising at least one pair of imaging devices, said imaging devices having overlapping fields of view looking across and in front of said display surface and capturing images of said region.

43. A golf simulator according to claim 42 wherein said imaging devices have generally perpendicular fields of view looking across and in front of said display surface.

44. A golf simulator according to claim 42 wherein said golf scene includes at least one foreground action element overlying and moveable over a background image, said processing structure updating said image data so that said at least one foreground action element responds to the simulation of said launched golf ball.

45. A golf simulator according to claim 42 wherein said processing structure processes said image data to detect pixel clusters resembling a characteristic signature thereby to detect said golf ball in said captured images.

46. A golf simulator according to claim 42 further comprising an audio system to broadcast audio.

47. A golf simulator according to claim 41 wherein said golf scene includes a plurality of foreground action elements independently moveable over said background image.

48. A golf simulator according to claim 41 wherein said at least one foreground action element, background image and launched golf ball simulation are non-destructive overlay image planes that are combined seamlessly to complete said golf scene.

49. A golf simulator according to claim 47 wherein said foreground action elements, background image and launched golf ball simulation are non-destructive overlay image planes that are combined seamlessly to complete said golf scene.

* * * * *